UNITED STATES PATENT OFFICE.

RUDOLPH A. LOEWENTHAL, OF NEW YORK, N. Y.

PRODUCTION OF RECLAIMED RUBBER.

SPECIFICATION forming part of Letters Patent No. 452,439, dated May 19, 1891.

Application filed February 3, 1891. Serial No. 380,046. (Specimens.)

*To all whom it may concern:*

Be it known that I, RUDOLPH A. LOEWENTHAL, a citizen of the United States, and a resident of New York city, county and State of New York, have invented a new and useful Improvement in the Production of Reclaimed Rubber, which improvement is fully set forth in the following specification.

This invention has reference to the production of what is known as "reclaimed rubber"—that is, a product derived from waste rubber articles, such as old boots and shoes, designed for use in the manufacture of rubber goods generally. The invention includes a certain improvement in the art or process of treating vulcanized rubber scrap and waste, as well as the improved article or product, hereinafter fully described.

According to the usual procedure the stock, after being reduced to a fragmentary condition, is passed through magnetic separators to remove some of the pieces of iron and steel present therein, and is then subjected to the acid or chemical cooking process to decompose the fiber. After washing, the stock is then charged into the devulcanizer and treated with live steam under pressure until devulcanized. When these operations are carefully and properly performed, the resulting product is a useful commodity, and is employed with advantage and economy in many rubber manufactures, being mixed in certain proportions with pure rubber. There are, however, some classes of rubber goods in the making of which the ordinary reclaimed rubber cannot be successfully used. In the manufacture of rubber clothing, carriage cloth, and other rubber-surface goods in which the rubber is spread, calendered, or otherwise coated upon the fabric in a very thin film, the presence of even a small proportion of reclaimed rubber will produce what are termed "pin-holes." These are due sometimes to small particles of metal or grit which, having escaped the various cleansing and separating processes and being difficult to detect on account of their small size, remain in the reclaimed stock and betray their presence by lack of cohesion with the adjacent particles of rubber. Flaws, weak spots, and similar defects result also from other causes, which must be removed in order to render possible the employment of reclaimed rubber in the manufacture of garments, hose, or tubing designed to resist pressure in use, and other analogous articles.

The object of the present invention is the production of reclaimed rubber free from the imperfections above pointed out and suitable in every respect for use in the manufacture of rubber clothing of the finest grades and other articles, such as specified. This result is effected by reducing the stock to the form of fine uniform powder, after elimination of the fiber, by chemical treatment and washing and before devulcanizing with live steam. The pulverizing of the stock at this precise stage in the operation of restoring or reclaiming rubber is attended with several results which are important for the purposes of this invention. When defiberized stock is devulcanized in the form of coarse fragments of irregular size, (as has been the practice prior to this invention,) it is not possible to obtain thorough devulcanization. Pieces of solid rubber (such as portions of boot-heels) will soften externally, but will retain a cone or kernel of vulcanized rubber, and such kernels, however small, will produce flaws and defects such as above pointed out. By pulverizing the rubber prior to devulcanization the thoroughness of the latter operation is insured and defects of this nature are avoided. Furthermore, it is found that notwithstanding the utmost care and pains in the various separating and purifying operations more or less metal pieces or particles (usually brass) will still remain in the stock, though their presence would be difficult to detect. The pulverizing operation both reveals the presence of these particles and makes it possible to remove them, for while the grinding operation reduces the rubber to powder it rolls out, spreads, and elongates the pieces of metal, so that it is impossible for the latter to pass through the sieve by which the stock is sifted. In addition to the metal particles, the improved process effects the removal of other foreign substances whose presence might not be known until attempt is made to use the reclaimed rubber in industries such as above referred to. It is well understood that impurities of this nature cannot be practically removed after devulcanization.

In order that the invention may be fully understood, I will now describe what has been found to be the best mode of carrying it into practice.

The stock is reduced by cracker-rolls to coarse fragments, and, after sifting to remove some of the sand and dirt, is passed through magnetic separators, whereby most of the iron and steel is removed. It is then cooked in the ordinary way with, say, sulphuric acid to decompose the fiber, and washed. It is next partially dried, care being taken not to remove all the moisture, as the operation of grinding is most successful when the stock is slightly moist. The stock is next pulverized by means of suitable grinding devices, such as smooth-faced rolls, being sifted in a screen of small mesh to bring it to a state of uniform fineness. Such stock as will not pass through the screen is again ground, and the operations of grinding and screening are repeated until the stock is all sufficiently reduced and of uniform fineness. During this operation the metal particles which still remain in the stock are eliminated, as already pointed out, and the result is a vulcanized-rubber powder, uniform in appearance and quality, free from fiber, metal, sand, and other foreign substances, and capable of use in manufactures for which no reclaimed-rubber product prior to this invention could be successfully used.

For the manufacture of rubber hose it is sufficient to pass the powder through a No. 20 or 30 screen; but for such as is to be used for rubber clothing, carriage cloth, and other rubber-surfaced goods I prefer to use a screen with a mesh as fine as fifty—that is, a wire mesh having fifty holes to the running inch, or two thousand five hundred holes to the square inch. This product is a marketable product, differing in its appearance and properties from the products of other reclaiming processes, and has been used in large quantities by manufacturers of rubber clothing and other like articles.

Prior to this invention a powder known as "clear black" has been made and used to some extent in the manufacture of low-grade rubber goods. It is produced by grinding the rubber and fiber together and blowing out some of the fiber that may become detached from the rubber by means of an air-blast. This process is extremely laborious and costly. The presence of the fiber, which forms into balls and knots, offers excessive resistance to the action of the rolls, necessitating the use of great power. The rolls have to perform the unnecessary work of grinding the fiber, which is a waste product, and, moreover, since the rubber and fiber can never be perfectly separated by grinding, no matter how often repeated, this process entails a great loss of rubber. The product ultimately obtained is of comparatively small commercial value.

When the rubber powder produced as herein described is devulcanized by means of live steam under pressure, the steam can act effectively, quickly, and with uniformity upon the entire mass, which, when discharged, is a homogeneous product and is free from hard kernels or undigested lumps of vulcanized rubber, however minute.

Having now fully described my said invention, what I claim, and desire to secure by Letters Patent, is—

1. In the art of reclaiming rubber from rubber waste, the improvement consisting in decomposing and eliminating the fibrous matters from the stock and then reducing the latter to a fine powder before devulcanizing, substantially as described.

2. The herein-described process of treating rubber waste to reclaim rubber therefrom, said process consisting in decomposing and eliminating the fiber from the stock, partially drying the latter and reducing it by grinding and sifting to a fine powder of uniform size and quality preparatory to devulcanization, substantially as described.

3. The reclaimed rubber powder produced by the above process, the said product being a vulcanized-rubber powder of uniform fineness and quality and free from metallic particles and similar foreign substances, substantially as described.

In testimony whereof I have signed this specification in the presence of two subscribing witnesses.

RUDOLPH A. LOEWENTHAL.

Witnesses:
WM. H. BLAIN,
C. B. G. GAILLARD.